United States Patent

[11] 3,556,329

| [72] | Inventors | Robert R. Johnston;<br>Robert L. Valliere, Muskegon, Mich. |
|---|---|---|
| [21] | Appl. No. | 859,585 |
| [22] | Filed | Sept. 18, 1969 |
| [45] | Patented | Jan. 19, 1971 |
| [73] | Assignee | Dresser Industries, Inc.<br>Dallas, Tex.<br>a corporation of Delaware<br>Continuation of application Ser. No.<br>696,180, Jan. 8, 1968, now abandoned. |

[54] STACKER CRANE WITH AN EXTENSIBLE LOAD SUPPORT MEANS
1 Claim, 12 Drawing Figs.

| [52] | U.S. Cl. ................................................ | 214/730 |
|---|---|---|
| [51] | Int. Cl. .................................................. | B66f 9/14 |
| [50] | Field of Search ..................................... | 214/730, |
| | 731, 16.4, 16.42, 16.1, 16.14; 198/190; 187/19;<br>212/55; 74/245, 250, 251 | |

[56] References Cited
UNITED STATES PATENTS

| 3,175,722 | 3/1965 | Paulssen ....................... | 214/731 |
|---|---|---|---|
| 3,371,804 | 3/1968 | Chasar ......................... | 214/16.4 |

FOREIGN PATENTS

| 1,416,298 | 9/1965 | France. | |

*Primary Examiner*—Gerald M. Forlenza
*Assistant Examiner*—Raymond B. Johnson
*Attorneys*—Daniel Rubin, Robert W. Mayer, Peter J. Murphy, Douglas M. Clarkson, Roy L. VanWinkle and William E. Johnson, Jr.

ABSTRACT: A self-contained article stacker unit suitable for mounting and operation on a variety of powered material handling equipment. The stacker unit includes a frame from which is operably supported a telescopically extendible fork section to move articles to and from storage positions.

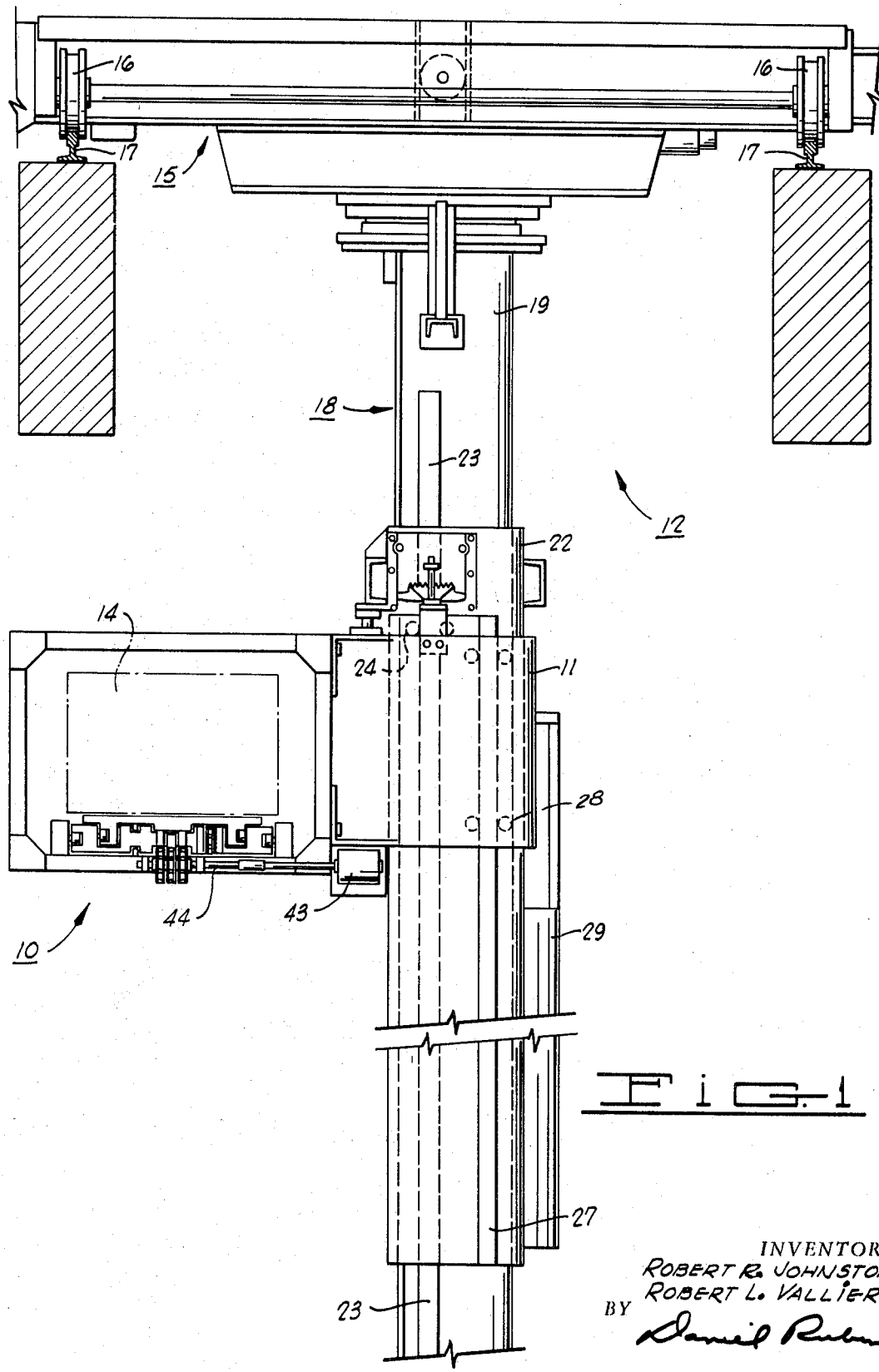

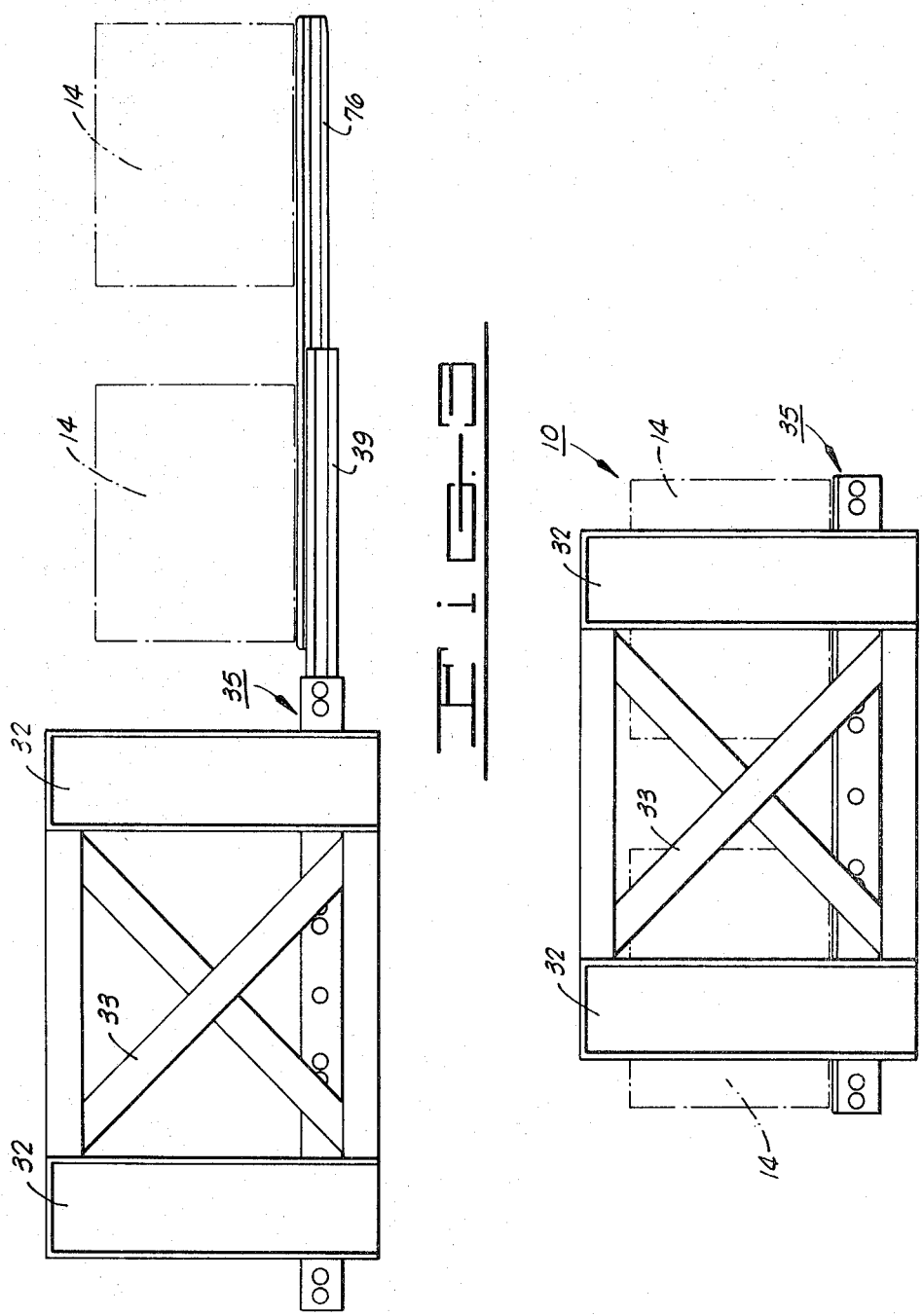

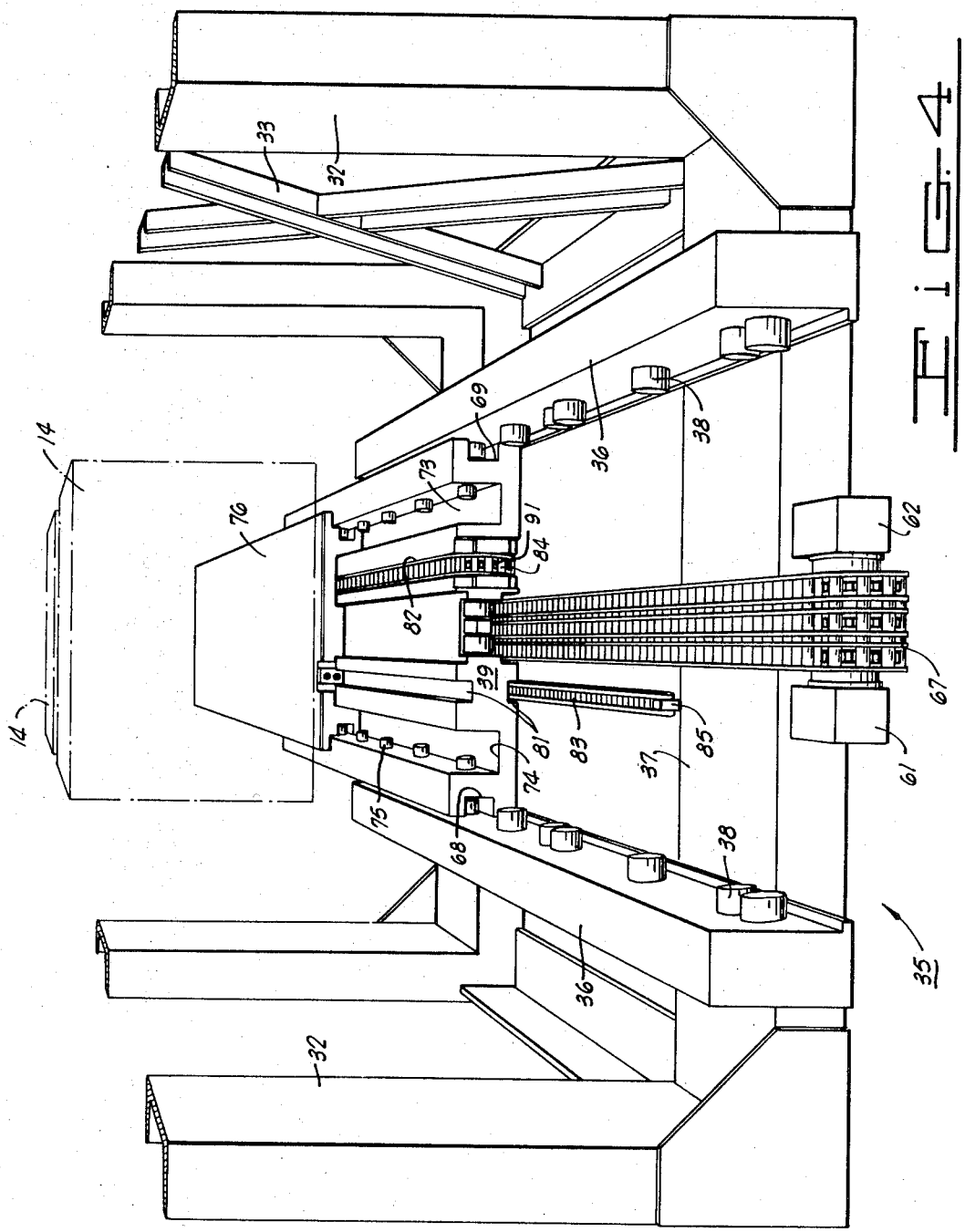

INVENTORS
ROBERT R. JOHNSTONE
ROBERT L. VALLIERE
BY
ATTORNEY

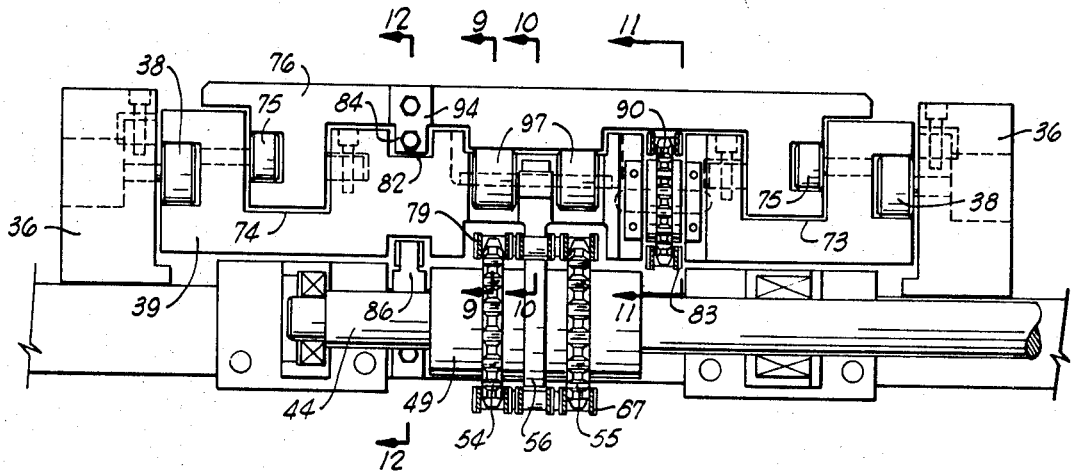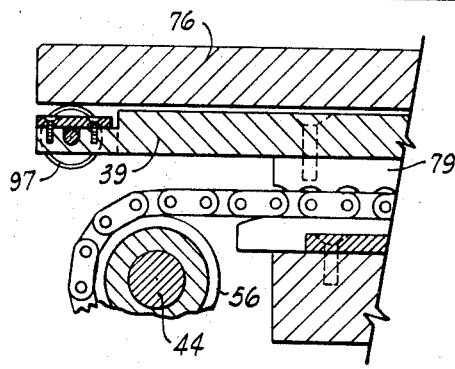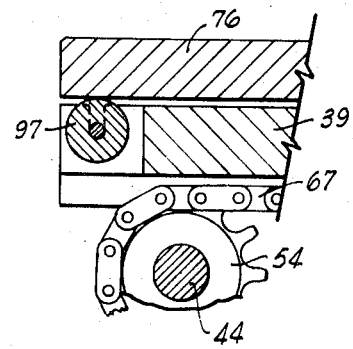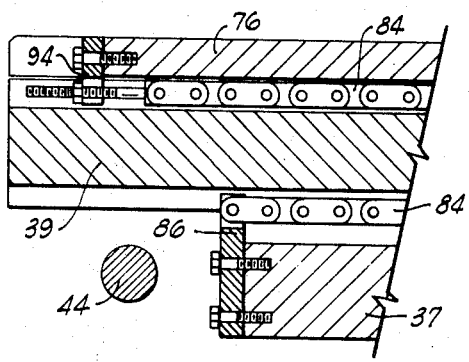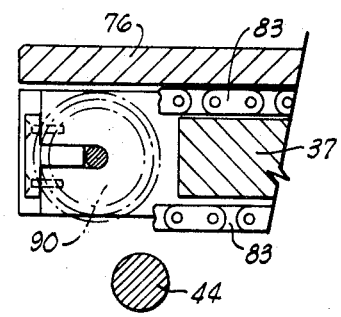

STACKER CRANE WITH AN EXTENSIBLE LOAD SUPPORT MEANS

This application is a streamlined continuation of Ser. No. 696,180 filed Jan. 8, 1968, now abandoned.

BACKGROUND OF THE INVENTION

1. The field of art to which the invention pertains includes the art of material handling and particularly the art of article stacking units and stacker cranes as for example contained in Patent Office class 214, subclass 731.

2. In modern industry and business where floor space is frequently at a premium, it is common to store materials, parts of other forms of inventory on shelving, bins or the like in the form of vertically spaced horizontal tiers. It is common for loading and unloading shelves or bins of this type to employ either a fork lift truck or a stacker crane depending on the specific needs of the customer. Exemplifying this art, are U.S. Pat. Nos. 2,574,045; 2,647,647; 2,951,599; and 3,175,722.

While each of the devices of the aforementioned Pats. have in themselves afforded some degree of advantage for a particular and specific need, each in effect includes a stacker unit inseparable and not elsewhere usable except as an integral part of the power-handling device with which it is fabricated. Not only are such stacker units not amenable to being more universally accommodated by a variety of power-handling equipment, but each by their construction have been unduly limited in the horizontal extents to which they can telescopically expand with the load away from the power equipment.

SUMMARY

This invention relates to a novel and compact self-contained stacker unit which is capable of being accommodated to a variety of different powered material-handling equipment as to generally have greater versatility than said stacker units of the prior art. Forming an essential feature of the unit is a novel telescopic construction which permits an otherwise similar fork unit to extend away from the central frame support for a horizontal distance substantially greater than heretofore and without the attendant problems such as special realignment procedures and the like associated with such prior art devices. By virtue of the construction hereof, it has become possible to operate such power-handling equipment as a stacker crane within very narrow aisle passages and yet load and unload articles onto storage shelves for substantially greater horizontal distances from the crane mast than has been possible heretofore. Because of the unique form of drive, structural deflection while extended does not adversely affect the telescoping action. At the same time, the construction hereof maintains structural deflection to a minimum while being fabricated with readily available component parts, effects substantially reduced manufacturing costs without sacrificing enhanced performance and quality.

It is therefore an object of the invention to provide a novel article stacker unit.

It is a further object of the invention to provide a novel article stacker unit that is self-contained and can be readily accommodated by a variety of different powered material-handling equipment.

It is a still further object of the invention to provide a novel stacker unit which is compact and self-contained and yet provides greater horizontal fork extensions than heretofore for loading and unloading articles onto storage space.

It is still another object of the present invention to provide a novel and improved article stacker enabling service to oppositely facing rows of storage areas which require a materially reduced aisle width for operation thereof whereby to increase the available and useful storage area within a given floor space.

BRIEF DESCRIPTION OF THE DRAWINGS

FIG. 1 illustrates the stacker unit hereof as employed in conjunction with a stacker crane;

FIG. 2 is a side elevation of the unit shown in its compacted state;

FIG. 3 is a side elevation of the unit in its horizontal extended state;

FIG. 4 is an end view perspective of the unit while in its extended state;

FIG. 8 is an end view opposite from that of FIG. 4;

FIG. 9 is a sectional elevation taken substantially along the lines 9-9 of FIG. 8;

FIG. 10 is a sectional elevation taken substantially along the lines 10-10 of FIG. 8;

FIG. 11 is a sectional elevation taken substantially along the lines 11-11 of FIG. 8; and FIG. 12 is a sectional elevation taken substantially along the lines 12-12 of FIG. 8.

Figure 6:
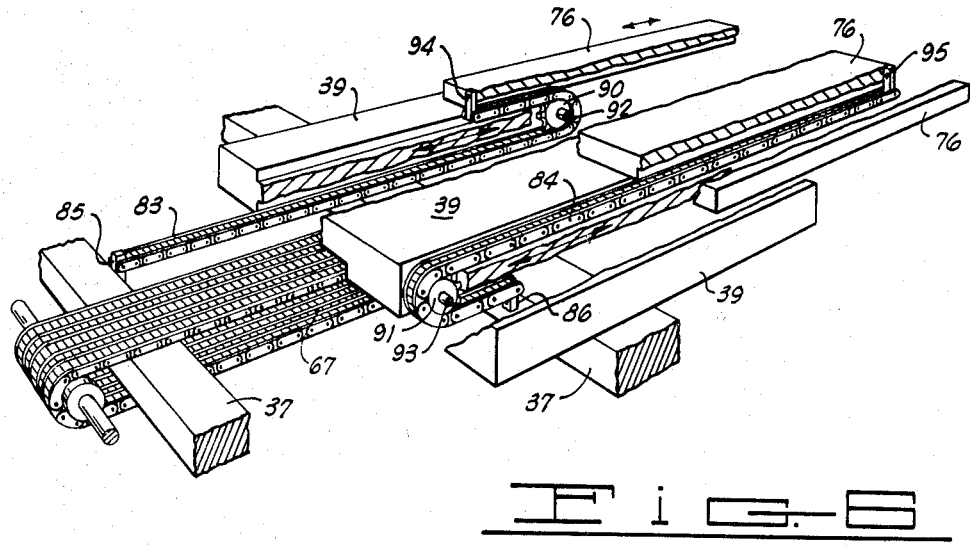
FIG. 6 is a fragmentary isometric of the drive for effecting relative telescoping movement between the overlapping load carrying component.

Referring now to the drawings and particularly to FIG. 1, the article stacker unit hereof is designated 10 and is shown for purposes of disclosure mounted via a coupled mast section 11 onto a stacker crane generally designated 12 which can comprise a type as disclosed for example in DeLigt U.S. Pat. No. 3,250,402 incorporated herein by the reference.

The crane briefly comprises a bridge assembly generally indicated at 15 and including a plurality of wheels 16 for riding along a pair of parallel rails 17 suitably supported within the facility to be served by the crane. Depending from the carriage is a mast assembly generally indicated at 18 comprising a fixed mast section 19 dependingly supported and fixed vertically relative to the bridge 15. Telescopically arranged over the fixed mast 19 is an intermediate mast section 22 guided for movement by means of an elongated rail 23 extending longitudinally along each side and stationary relative to the fixed mast 19. A plurality of rollers 24, carried by the intermediate mast, engage with opposite sides of each of the rails 23 to provide rolling movement. Telescopically arranged over the intermediate mast section is the stacker support section 11 coupled to the stacker unit 10. The section 11, and thus the stacker unit, is guided longitudinally of the intermediate mast by a pair of longitudinally extending rails 27 on opposite sides thereof. A plurality of rollers 28 engaging opposite sides of the rail permits vertical rolling movement of section 11 relative thereto.

The vertical driving force for the stacker unit is effected via a cable (not shown) supported from the bridge assembly and power driven from a suitable remote source. As shown in FIG. 1, the stacker is in a partially raised condition from the floor disposed generally alongside an operator's cab 29 whereat an operator is substantially at eye level with respect to the load being processed by the stacker unit.

The stacker unit can be initially understood by reference to FIGS. 2 and 3 wherein as there shown, the unit comprises an integral unitary structure distinct and separated from a powered material-handling equipment with which it is to be employed. Referring first to FIG. 2, the stacker unit includes a compact cubelike frame structure with substantially parallel side panels each constructed of spaced channels 32 connected via a cross brace 33. Between the side panels is supported the telescopically operable load carrying unit 35 which operably extends horizontally from the frame in either and both directions.

Figure 5:
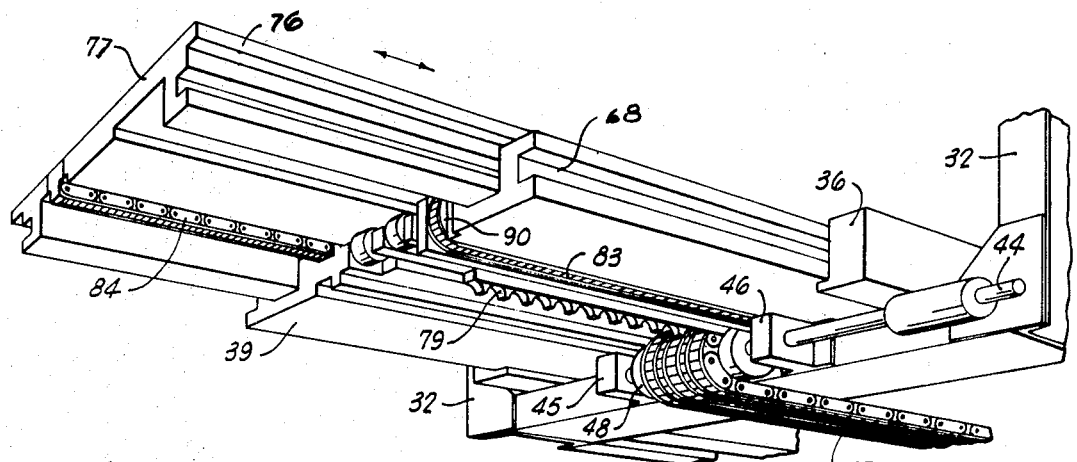
FIG. 5 is a bottom-side view of the drive components.
Figure 7:
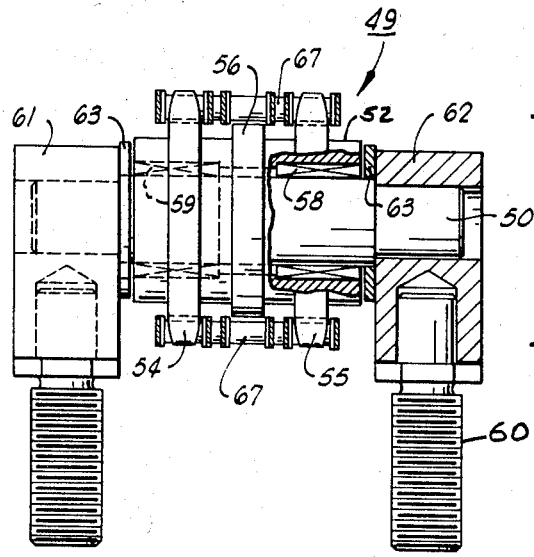
FIG. 7 is an elevation partly in section of the drive idler sprocket.

The load carrying unit can be best understood by reference to the remaining FIGS. 4-12. The primary support therefor consists of a pair of spaced guide rails 36 secured on the inside of each frame side panel and which are secured together via laterally extending spaced apart channels 37 connecting to the rails 36. On the inward surface of each guide rail 36 are a plurality of axially aligned longitudinally spaced guide rollers 38 which accommodate and provides roller bearing support to the lower load carrying stacker section 39 throughout the extent of its movement as will be described.

Drive for the telescoping operation in either and both directions is furnished from a motor 43 (FIG. 1) remotely controlled and the output of which is connected to a drive shaft 44 supported for rotation within spaced-apart journal boxes 45 and 46 mounted on the frame. Secured to the shaft intermediate the bearing boxes is a front sprocket unit 48 generally similar to idler sprocket 49 shown enlarged in FIG. 7 but differing therefrom by the latter being rotatable on its idler shaft 50 while the former is rotatably secured to rotatable drive shaft 44. Each sprocket unit therefore, includes an axial hub 52 for mounting on their respective shafts and which supports a pair of spaced integral sprocket wheels 54 and 55 between which is included an annular toothless ridge 56 of diameter not greater than the inside diameter of the adjacent juxtaposed sprocket wheels. Because of its relative rotation on its support shaft, sprocket 49 also includes bearings 58 and 59 while shaft 50 is mounted in turn in end blocks 61 and 62 which via posts 60 secure to the frame. Spacing washers 63 at each end face of the sprocket maintain the longitudinal alignment of the sprocket unit 49 with respect to the drive sprocket 48.

Extending over the two sprocket units is a triple stranded endless roller chain 67 coupled for integral conjoint movement. The outer chain strands engage sprocket wheels 54 and 55 while the intermediate strand thereof travels merely in coupled engagement therewith in response to drive motion supplied from the motor 43.

Operably engaged directly with the chain 67 for appropriate advancement thereby in either direction is the lower load section or platform 39. This platform has a somewhat irregular geometric cross section that includes opposite longitudinal guide slots 68 and 69 along its side edges to accommodate the guide rollers 38 in close fitting rolling and resting relation thereto. Further inward from the sides is a pair of topside guide slots 73 and 74 in which are supported guide rollers 75 longitudinally spaced in axial alignment similar to guide rollers 38. The rollers 75 serve to accommodate movement of the upper load carrying section or platform 76 on which a load 14 is shown being supported. In order to advance the lower platform 39, there is included on the underside thereof a longitudinally extending rack 79 which is in constant mesh engagement with the center strand of chain 67 as to never disengage therefrom throughout the available travel extent. This ensures continuous positive engagement as to avoid the necessity of special realignment apparatus while at the same time permits a rapid directional reverse past the frame center without drive disengagement. Maximum travel extent to avoid ultimate disengagement in either direction is effected by adjustable limit stops (not shown) which deenergize the motor 43 at the appropriate position of travel.

The upper platform 76 terminates at end 77 in a bifurcated fork configuration or the like by which to embrace the load. It has a lower surface at least partially complementary to the upper surface of the lower platform and partially interlocated therewith. Movement or advance of the upper platform is concomitant with platform 39 but at a rate somewhat greater to provide a continuing telescopic effect with the upper platform advancing forward faster than the lower. A relative advance ratio on the order of about 2 to 1 has been found satisfactory for this purpose. Relative movement between the platforms is achieved by means of two single stranded end-connected chains 83 and 84 extending within upper and lower longitudinal lower platform slots 81 and 82. At one end the chains are respectively anchored at opposite crossbars 37 of the unit frame at points designated 85 and 86 while at their opposite ends are anchored to the upper platform at points 94 and 95 respectively. Each of these last mentioned slots contain idler sprocket wheels 90 and 91 on stationary shafts 92 and 93 respectively and over which the chains extend in mesh engagement therewith. Therefore, as the lower platform advances the sprockets acting against the chains cause concomitant movement of the upper platform at a slightly greater but uniform rate. By this means not only are the two platforms being maintained in constant drive engagement, but by virtue of guide rollers 75 as well as central supporting guide rollers 97 they are maintained in constant free rolling relation to each other.

By the above description, there is disclosed a novel stacker unit which is integral and self-contained and suitable for being employed in connection with a variety of powered material-handling equipment. By virtue of the specific construction extremely low friction forces are encountered in the telescoping action of the unit thereby enabling use of relatively small drive motors for effecting operation. Since the telescoping members are never disengaged from the motor drive, positive to-and-fro operation is assured without subsequent remeshing that has been required in such prior art devices. Yet because of the elongated constant mesh afforded between the rack and chain longitudinally extending in a direction of the telescoping movement, the limiting extent of movement for the size of components is assured to the maximum. Moreover, because of compactness of the drive, even maximum telescopic extension does not produce appreciable deflection in the sections and what deflection may occur will not adversely affect the telescoping action.

Since many changes could be made in the above construction and many apparently widely different embodiments of this invention could be made without departing from the scope thereof, it is intended that all matter contained in the drawings and specification shall be interpreted as illustrative and not in a limiting sense.

I claim:

1. In combination with a traveling stacker crane including a vertically adjustable mast assembly, a self-contained article stacker unit comprising in combination:
   a. a supporting frame mounted onto the mast assembly of said crane and including parallel spaced apart guide rails and a plurality of first guide rollers secured longitudinally spaced along the inside wall surface of each of said guide rails;
   b. a motor drive secured to said frame;
   c. an endless chain of three juxtaposed strands secured together for conjoint movement therebetween;
   d. rotatable sprocket means including two coaxially mounted interconnected sprockets engaging the outer strands of said chain and operatively connected to said motor drive to advance said chain when said motor drive is energized; and
   e. a load carrying unit secured to said frame and telescopically extendible therefrom said unit comprising:
      1. a first section laterally movable relative to said frame and including a first base, an elongated longitudinally extending rack on the underside of said first base in driving mesh with the center strand of said chain, a first pair of parallel guide slots defined with one slot in each opposite side face of said first base and longitudinally extending to receive said first guide rollers for supporting said first base thereon, a second pair of parallel guide slots defined in a top surface of said first base inwardly of and parallel to said first pair of guide slots, and a plurality of second guide rollers secured longitudinally spaced along an inside wall surface of each of said second guide slots;
      2. a second section superposed over said first section for movement relatively parallel thereto and including a second base, parallel rails depending from the underside of said second base and spaced apart interfitting in said second guide slots, and a third pair of parallel guide slots defined with one slot in each opposite side face of said second base and longitudinally extending to receive said second guide rollers for supporting said second base thereon; and
      3. relative drive means chain connecting said first and second sections to relatively advance said second section in the same direction in response to movement of said first section.